United States Patent [19]

Corrigan

[11] Patent Number: 4,608,029
[45] Date of Patent: Aug. 26, 1986

[54] CONTROL FOR SLURRY PROCESSING SYSTEM

[75] Inventor: John J. Corrigan, Garden Grove, Calif.

[73] Assignee: Morehouse Industries, Inc., Fullerton, Calif.

[21] Appl. No.: 438,416

[22] Filed: Nov. 1, 1982

Related U.S. Application Data

[63] Continuation-in-part of Ser. No. 427,162, Sep. 29, 1982, abandoned.

[51] Int. Cl.$^4$ .............................................. F16H 11/06
[52] U.S. Cl. ........................................ 474/11; 474/28; 74/863
[58] Field of Search ....................... 474/11, 12, 17, 18, 474/28, 29, 43, 148, 13; 366/601 X; 91/386, 387; 417/223; 62/136; 138/40; 74/DIG. 7, 863; 241/36, 33, 46

[56] References Cited

U.S. PATENT DOCUMENTS

| | | | |
|---|---|---|---|
| 1,464,704 | 8/1923 | Goldberger | 366/601 |
| 2,296,979 | 9/1942 | Byrne | 474/28 |
| 2,384,744 | 9/1945 | Hoelscher | 74/DIG. 7 |
| 3,174,348 | 3/1965 | Luenberger | |
| 3,650,121 | 3/1972 | Kimpel et al. | 62/136 |
| 3,777,993 | 12/1973 | Crandall | 241/46 B X |
| 4,132,120 | 1/1979 | Fenart | |
| 4,161,894 | 7/1979 | Giacosa | 474/12 |
| 4,212,326 | 7/1980 | Gererey | 138/40 |
| 4,241,618 | 12/1980 | Smirl | 74/863 |
| 4,263,838 | 4/1981 | St. Laurent, Jr. | 91/387 |
| 4,411,590 | 10/1983 | Meredith | 415/26 |

Primary Examiner—James A. Leppink
Assistant Examiner—Frank McKenzie
Attorney, Agent, or Firm—Knobbe, Martens, Olson & Bear

[57] ABSTRACT

The present invention provides a control unit for use with a variable speed system for dispersing, milling or otherwise processing solid particles in liquid. The apparatus used in the system includes a fixed center-drive pulley combination. The control unit automatically resets the pulley combination to a slow start-up position to prevent damage to the system drive train during initiation of a processing operation. In addition, the control unit allows a system operator to precisely and safely adjust the setting of the pulley combination to control the speed of the processing operation. In one arrangement the speed is controlled by manually operated valves that control fluid pressure on opposite sides of a piston that controls the pulley combination. In another arrangement, valves automatically control fluid pressure on the piston to maintain a position in response to a signal from a pressure regulator which is manually or otherwise adjusted to provide a selected speed.

27 Claims, 5 Drawing Figures

CONTROL FOR SLURRY PROCESSING SYSTEM

RELATED APPLICATION

This is a continuation-in-part of U.S. application Ser. No. 427,162, filed Sept. 29, 1982 now abandoned.

BACKGROUND OF THE INVENTION

This invention relates generally to systems for dispersing, milling, or otherwise processing solid particles within a liquid and more particularly to an improved automatic control unit for remotely varying the speed of such a system.

Because of the large volume of product often being processed at one time in an industrial dispersing or milling operation, and because of the high viscosity of some of the product being dispersed, the rotational loads on the impeller or rotor and drive system are quite large. The start-up torque is particularly large if a system has been shut down for many hours in that the temperature of the product is usually lower at start-up and some liquids actually tend to gel. Thus, with a fixed-speed system, there is danger of overstressing the equipment, breaking components, etc. One advantage of a variable speed system is that the rotor can be started at a slow speed.

In one known variable speed system, an electric motor is employed to drive the rotor through a combination of V-belts and adjustable pulleys. In such an arrangement, the effective diameters of the drive pulleys are changed by axially varying the position of pulley halves and thereby varying the diameter of the pulley surfaces engaged by the drive belts.

There are a number of major disadvantages to such an arrangement. For example, the speed of the pulley combination can only be adjusted while the pulleys are being driven by the drive motor. In practice, an operator is instructed to return the pulley combination to a slow start-up speed prior to the end of a dispersion operation. However, if the operator neglects to take this step, a following dispersing operation must be initiated at a higher start-up speed than is desired. As a result, drive shafts and pulley belts can be damaged and the life of the drive motor reduced due to high resistance at the initiation of a processing operation which overloads the drive train of the system.

Typically, the pulley adjustment operation is accomplished by means of a control shaft and gear mechanism that is hand-driven by the operator. This control operation requires considerable force, is somewhat slow, and the control is often somewhat awkwardly positioned such that the operator is subjected to some danger of being too close to moving components in the system. These are undoubtedly some of the reasons that operators neglect to move the components to the slow speed position whenever the system is to be stopped.

Another drawback of this known system is that it typically requires an operator to give constant adjustment and attention to a single system.

Thus the need exists for improved controls for a variable speed slurry processing operation.

SUMMARY OF THE INVENTION

The present invention provides a variable speed processing system wherein the speed of operation is automatically reset to a slow start-up position whenever the power is shut off. Also, the desired speed may selectively be obtained with the system. In addition, the control may be remotely located so that it is easy to operate and provides repeatable quick operation.

In a preferred form of the invention, the means for automatically resetting the pulley combination to a slow start-up speed comprises an air or other fluid pressure source for controlling an actuator which reacts to air pressure variations, and the movement of the actuator in turn changes the speed of a pulley drive system. As the rotor drive motor is shut off, suitable valve means react to disengage the air pressure source and allow the actuator to vent to a slow start-up speed position.

In one arrangement, particularly suited for the operation of a high speed disperser, the means for remotely adjusting the speed of the pulley combination comprises fast and slow control vent valves which are independently coupled to the actuator, responsive to independent inputs, such as manually operated speed controls, and responsive to the fluid pressure source. Activation of the fast control vent valve disengages the pressure source from one chamber of the actuator, and results in the actuator venting to a higher speed setting. Activation of the slow control vent valve disengages the air pressure from the other side of the actuator and results in venting to a slower speed setting. This conveniently allows the operator to make frequent speed changes based on observed conditions of the dispensing operation. Various air pressure regulators, check valves, and leak-out restrictors assure proper selection, adjustment and maintenance of any of the infinite speed settings.

In another form of the invention, particularly suited to the operation of a sandmill, the operator merely selects a desired speed and the system will reach and maintain such speed. For this purpose, there is employed a device containing vent valves that automatically position the actuator in response to a signal received from a pressure regulator that is manually adjustable to provide the desired speed. The actual position of the actuator is fed back to the positioner device to monitor and maintain the selected speed. Such an arrangement is very convenient because of the large variety of materials processed by a sandmill. In the past, most of such milling has been performed at the same speed. The present invention permits the optimum speed for each operation to be determined, selected, and then automatically maintained.

The above and other features of the present invention become apparent through a description of preferred embodiments of the invention as depicted in the following drawings.

DESCRIPTION OF A PREFERRED EMBODIMENT

Figures 1, 2:
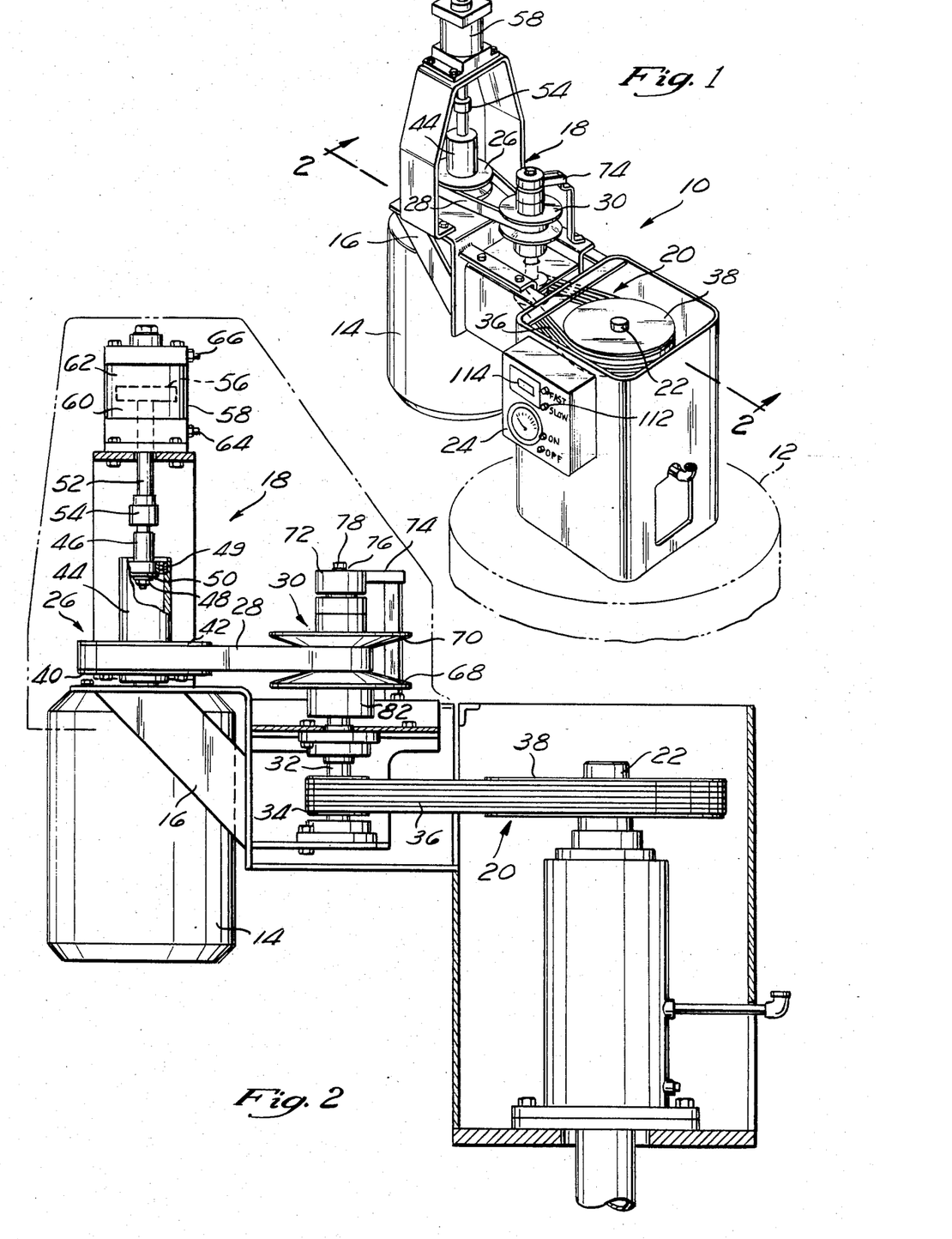
FIG. 1 is a perspective view of a variable speed dispersing system having a fixed center-drive pulley combination which is responsive to a control unit.
FIG. 2 is a side elevational view, partially in section, of the dispersing system taken along line 2—2 of FIG. 1.

Referring to FIG. 1, a dispersing system 10 is shown mounted upon a dispersing tank 12. Generally, a drive motor 14 is mounted to a housing assembly 16, and drives a fixed center-drive, variable speed pulley combination 18. The fixed center-drive pulley combination 18 is discussed in detail below in reference to FIG. 2 and FIG. 3. The pulley combination 18 transfers power, via a hub and sheave pair 20, to a rotor drive shaft 22 (shown in FIG. 2). The dispersing drive shaft 22 extends into the dispersing tank 12 to drive an impeller or other rotor (not shown) which disperses particles in a liquid which is contained therein. A control unit 24 automatically resets the pulley combination 18 when the system 10 is shut down, and enables an operator (not shown) to remotely adjust the speed setting of the fixed center-drive, variable speed pulley combination 18.

Referring to FIG. 2, the motor 14 is coupled to and drives a controllable pulley 26 of the pulley combination 18. The controllable pulley 26 is coupled, via a belt 28, to a spring-loaded pulley 30. The spring-loaded pulley 30 is coupled, via a jackshaft and key 32, to a first hub and sheave 34, which is coupled, by V-belts 36, to a second, larger hub and sheave 38 which, in turn, drives the dispersing drive shaft 22.

Figure 4:
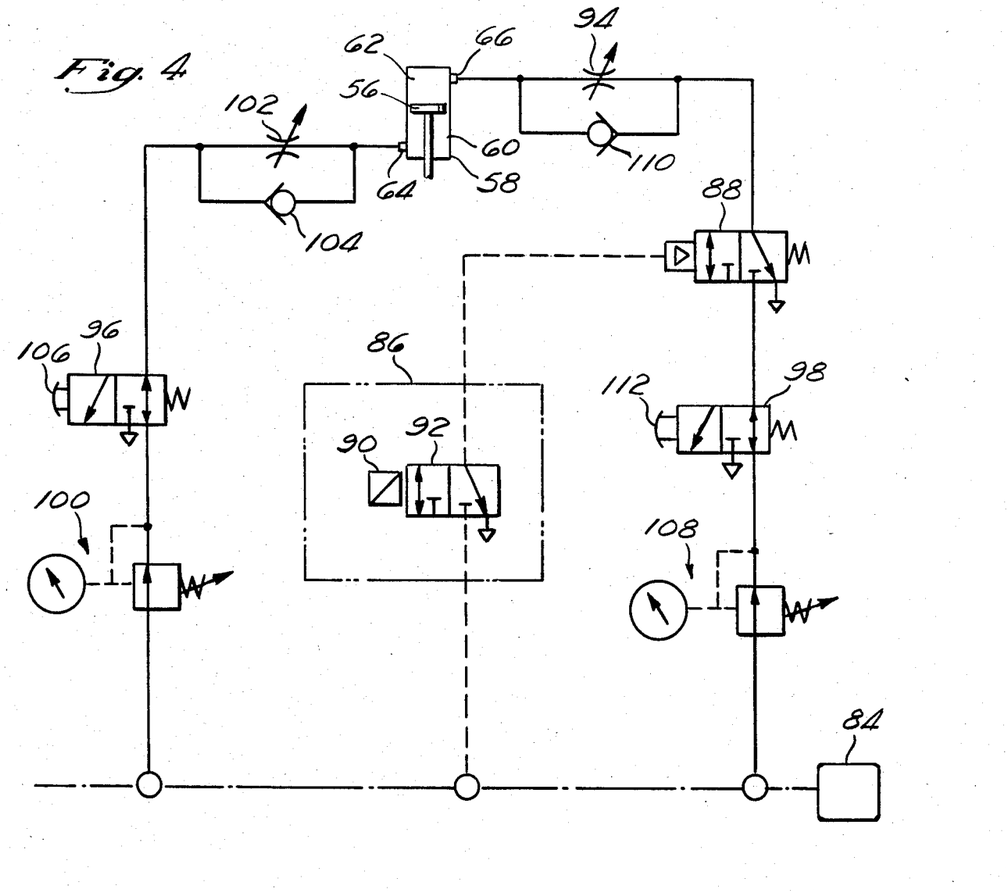
FIG. 4 is a circuit diagram of the control unit for the variable speed dispersing system of the above-referenced figures.

Referring to FIGS. 2 and 4, the controllable pulley 26 comprises opposing faces 40 and 42. Face 42 is axially moveable away from face 40, and is coupled to a tubular assembly bracket 44 and to a thrust shaft 46 via nut 48, washer 50, bearing 49 and retainer 51. Thrust shaft 46 is connected to an actuator or shaft 52 by a coupler 54. The piston shaft 52 is coupled at the other end to an actuator in the form of air piston head 56 located in an air cylinder 58. The air cylinder 58 comprises a lower chamber 60 on a first side of the piston head 56, and an upper chamber 62 on the second side of the piston head 56. Air inputs 64 and 66 vent directly into the chambers 60 and 62 respectively.

The spring-loaded pulley 30 comprises opposing faces 68 and 70. Face 68 of spring-loaded pulley 30 is axially moveable towards face 70. Face 70 of pulley 30 is coupled to a housing 72 and to a bracket 74 via washer 76 and nut 78. Bracket 74 secures the spring-loaded pulley 30 to the housing assembly 16. A spring 80 is held in housing 82 and acts against the moveable face 68 in reaction to the controllable pulley 26. Pulley face 68 is coupled to the sheave and hub 34 as described above.

Figure 3:
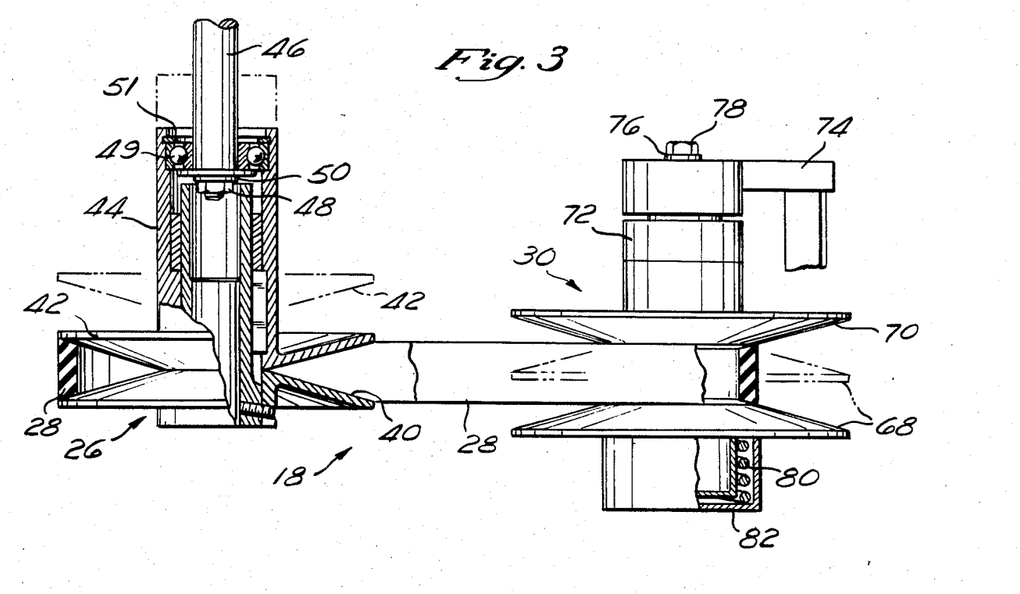
FIG. 3 is a side elevational view, partially in section, of the fixed center-drive pulley combination shown in FIG. 1 and FIG. 2.

The pulley combination 18 is shown in FIGS. 2 and 3 adjusted to a maximum speed setting. It is noted that controllable pulley 26 is set with opposing faces 40 and 42 positioned as closely together as possible, resulting in a maximum effective diameter. This position is achieved by venting air out of the lower chamber 60 of the air cylinder 58 through input 64, causing the air piston 56 to be forced downward by the greater air pressure on the upper chamber 62 through input 66. As the moveable face 42 is forced towards the fixed face 40, the belt 28 tracks up the sloped faces 40 and 42 toward the perimeter of the faces 40 and 42, resulting in the greater effective diameter of the controllable pulley 26. Simultaneously, the moveable face 68 of the spring-loaded pulley 30 necessarily compresses the spring 80 as the belt 28 tracks down the sloped faces 68 and 70 toward the center of the faces 68 and 70, resulting in the correspondingly decreased effective diameter of the spring-loaded pulley 30.

In contrast, a slow-speed position is achieved by venting air out of the upper chamber 62 through input 66 to allow the air piston 56 to be forced upward by greater air pressure in the lower chamber 60. As a result, the moveable face 42 is forced away from the fixed face 40 and the belt 28 tracks down the sloped faces 40 and 42 towards the center of the faces 40 and 42, resulting in a decreased effective diameter of the controllable pulley 26. Simultaneously, as the belt tracks down the faces 40 and 42 of the controllable pulley 26, the spring 80 of the spring-loaded pulley 30 forces the moveable face 68 closer to the fixed face 70, and causes the belt 28 to track up the sloped faces 68 and 70 towards their perimeter, resulting in an increased effective diameter of the spring-loaded pulley 30. At all times, adjustment of the speed of the fixed center-drive pulley combination is done while the pulleys are rotating.

Referring to FIG. 4, the chambers in the air cylinder 58 are connected to a source of shop air or other suitable air supply 84. For resetting the piston 56, there is provided a pilot valve 86 which is coupled to the air supply 84, the drive motor 14, and to a reset valve 88. Reset valve 88 is also coupled to the air cylinder 58 and to the air supply 84 through the pilot valve 86. The pilot valve 86 includes a solenoid 90 which is electronically coupled to the drive motor 14. A two-position vent valve 92 is controlled by the solenoid 90. The reset valve 88 is coupled to the vent valve 92 and reacts to air pressure from the air supply 84. The reset valve 88 remains in a normal position, which prevents the automatic resetting of the pulley combination 18 unless activated by the pilot valve 88 remains in a normal position, which prevents the automatic resetting of the pulley combination 18 unless activated by the pilot valve 86.

As the motor 14 is shut off at the completion of a dispersing operation, the solenoid 90 forces the two-position vent valve 92 into a vent position, as shown in FIG. 4. As a result, the two-position reset valve 88 is disconnected from the air supply 84, and reacts to the decreased air pressure by switching to a vent position, as shown in FIG. 4. Thereafter, existing air pressure in the cylinder chamber 62 exits through opening 66, passes at a set rate through a leak-out restrictor 94, and exits to the atmosphere through the reset valve 88. Piston 56 is then forced upward by the greater air pressure in the upper chamber 60. As explained above, when the piston 56 is forced upward, the moveable face 42 of the controllable pulley 26 is set to a slower speed, causing the corresponding reaction by the spring-loaded pulley 30.

Thus, by simply shutting off the drive motor 14, the control unit automatically resets the pulley combination 18 to a slow start-up position, thereby preventing damage to drive shafts, pulleys, belts, and the drive motor during initiation of the next dispersing operation.

The control unit of FIG. 4 additionally includes means for remotely adjusting the speed of the pulley combination 18. A fast control vent 96 is coupled to the air supply 84 through an air regulator 100. The fast control vent 96 is also coupled to the chamber 60 of the air cylinder 58 through a leak-out restrictor 102 and a check valve 104. The fast control vent 96 is activated by a push button 106, and has two positions: a position, shown in FIG. 4, which allows air from supply 84 to reach the lower chamber 60 through the check valve 104, and a position which is activated by an independent input at a push button 106 and allows air to vent out of the lower chamber 60 through the leak-out restrictor 102 and into the atmosphere through vent 96.

Thus, a greater pulley combination speed can be achieved by depressing the push button 106 to cause the control vent to switch to a vent position, resulting in the lower chamber 60 being disconnected from the air supply 84. As explained above, when piston 56 is forced downward by a greater air pressure in the upper chamber 62, the pulley combination 18 is correspondingly switched to a faster speed position as the moveable face 42 of the controllable pulley 26 is forced closer to the fixed face 40. The leak restrictor 102 assures that the piston movement to a faster speed occurs at a controlled rate so as to prevent damage or malfunction of the pulley and belt combination. Air regulator 100 allows for exact adjustment of an irregular air supply 84 to prevent unwanted variations in air pressure in the chamber 60 as caused by surges in air pressure.

A slow control vent 98 is coupled to the air supply 84 through an air regulator 108 and to the upper chamber 62 of air cylinder 58 through the reset vent 88, leak restrictor 94, and a check valve 110. The slow control vent 98 is activated by a push button 112, and operates in a manner similar to that of fast control vent 96; namely, slow control vent 98 normally remains in a position to allow air from the air supply 84 to pass through to the reset valve 88. For the air pressure to be applied through reset valve 88 and into the upper chamber 62, it is of course necessary that the motor 14 be activated so as to cause the pilot valve 86 to transmit air pressure to switch the valve 88 into non-venting position as discussed above. In such a position, air from supply 84 passes through the control vent 98, through the reset valve 88, through check valve 110 and into the chamber 62 to act against the air piston head 56.

To move the pulley combination 18 to a slower speed setting, push button 112 is depressed to cause the control vent 98 to switch to a vent position. As a result, air vents through leak-out restrictor 94, through reset valve 88, and into the atmosphere through control vent 98. The air pressure still applied to the lower chamber 60 acts against the air piston head 56 to force the piston 56, and hence the moveable face 42 of controllable pulley 26, upwards to a slow speed position. The control unit 24, as shown in FIG. 1, can include a tachometer 114 linked to a suitably located tachometer sensing means for gauging the speed of the pulley combination 18. Thus, if a greater speed is desired, the operator can depress the fast button 106 to activate the fast control vent 96 until the desired speed is set as gauged by the tachometer 114. Similarly, if a slower speed is desired, the operator depresses the slow button 112 to activate the slow control vent 98. When the desired speed is reached as gauged by tachometer 114, the button 112 is released. Regulators 100 and 108 allow for fine adjustment of the air supply 84 to prevent drifting of the piston 56 as caused by the effective pull of the belt under tension or other irregularities in the system. As described above, when the dispersing process is completed and the motor 14 is shut off, pilot valve 86 activates the reset valve 88 to switch to a vent position and reset the piston 56, and hence the pulley combination 18, to a slow start-up speed position in preparation of the next dispersing operation.

Figure 5:
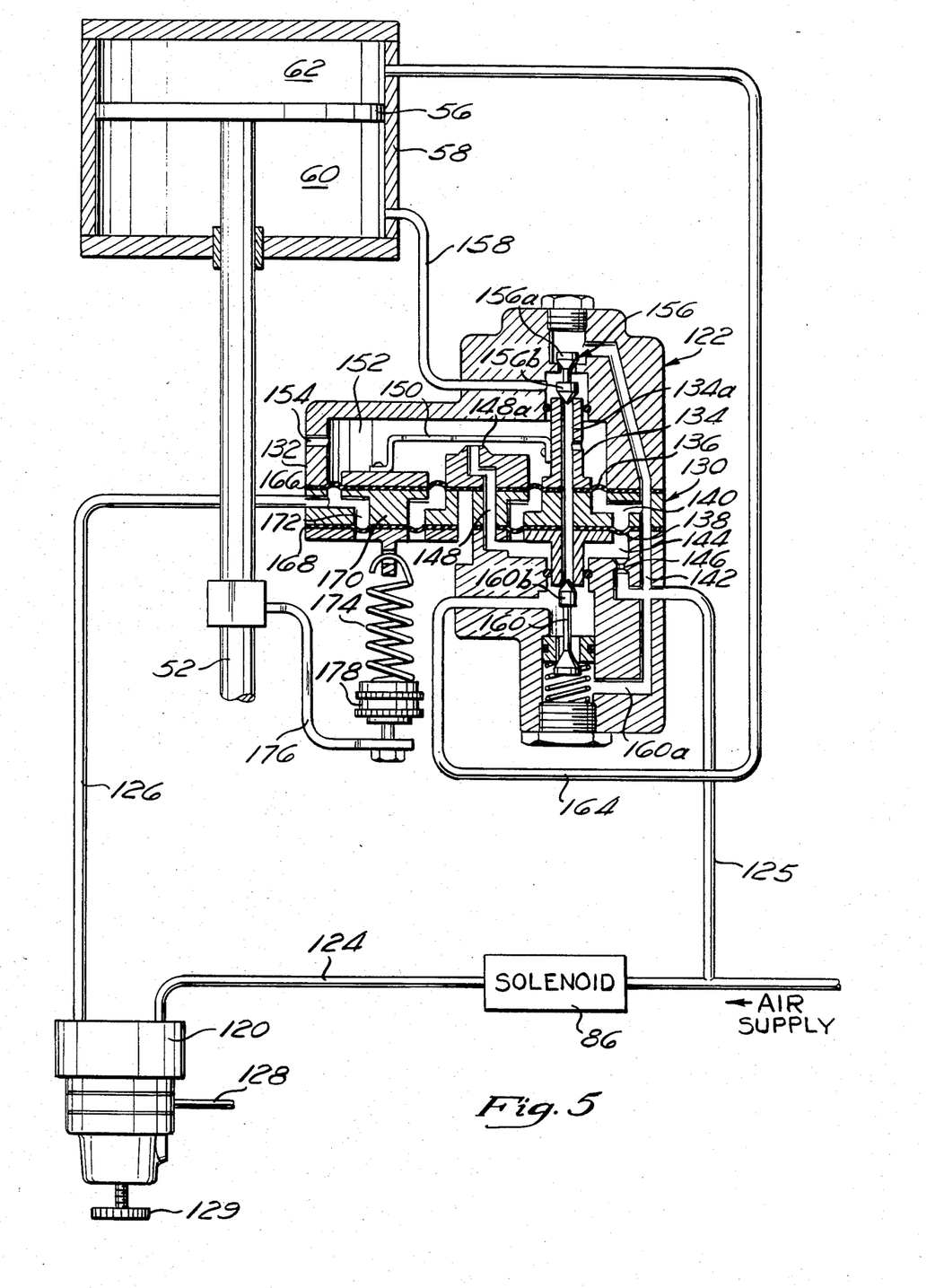
FIG. 5 is circuit diagram for another form of the control unit of the invention wherein a particular speed desired is set and automatically maintained.

THE EMBODIMENT OF FIG. 5

In some slurry processing operations, it is particularly desirable that a specific rotor speed be selected and automatically maintained. This selected speed may be different for the processing of different materials, and thus it is important that a variable speed capability be provided. The arrangement of FIG. 5 automatically satisfies such requirements, as well as having the control unit automatically returned to its slowest speed when the rotor is to be stopped.

The arrangement of FIG. 5 is adapted to operate an adjustable belt and pulley combination of the type illustrated in FIGS. 1, 2 and 3. Thus there is schematically illustrated in FIG. 5 an actuator piston 56, as in FIG. 4, positioned in a cylinder 58, with a piston rod 52 extending out the lower end of the cylinder. The piston, in combination with the cylinder, forms a lower chamber 60 on one side of the piston and an upper chamber 62 on the other side.

While the pulley and belt combination moved by the piston rod 52 may be employed to drive a high-speed disperser of the type illustrated in FIG. 2, other milling and/or dispersing apparatus may be driven by such a system instead. For example, the control of FIG. 5 is particularly adapted for controlling the speed of a rotor in a sand milling operation. As is well known, in a sand-milling operation, a slurry is pumped through a small diameter grinding media which is agitated by a motor driven rotor. Examples of sandmills are shown in U.S. Pat. Nos. 3,995,818 and 4,140,283, and sold by the assignee of the present invention. Sand mills are utilized to process a large variety of products, including paints, dyes, pigments, coatings for magnetic tape, and many other materials. In those operations, it is desirable to operate the sand mill at a specified optimum speed that is related to the characteristics of the material being processed.

For providing such operation, there is employed a solenoid valve 86, a pressure regulator 120, and a positioner 122 which is connected to control the position of the piston 56. The solenoid valve which may be identical to that employed in FIG. 4, is connected to a suitable air supply and is energized in connection with the motor employed for operating the rotor in the sandmilling or other slurry processing operation.

Pressure regulator 120 receives air pressure from the valve 86 through a line 124 and provides a desired output pressure through line 126. A vent line 128 is provided for maintaining the desired output pressure. The pressure regulator valve 120 is manually adjustable by a suitable adjustment knob or wheel 129 to provide a desired pressure. Any suitable adjustable pressure regulator valve may be employed. One suitable type is manufactured by Moore Products Co. of Spring House, Pa., identified as Model Series 47, 51, or 52. A schematic circuit diagram of the Moore regulator valve is illustrated in a Moore product brochure SD514, and a description of the operation is provided on page 2 of that brochure. In the Moore product, the adjustment wheel 129 adjusts spring pressure on a range spring (not shown) that applies pressure on a regulating diaphragm (not shown).

The positioner 122 may be any suitable device which will control the application and venting of fluid pressure to an actuator in response to an input pressure signal and feedback information on the position of the actuator. One suitable device is also made by Moore Products, identified as that company's Model 74. A schematic illustration of the device, similar to that shown in FIG. 5, is shown in a Moore Products publication dated April, 1979, wherein the device is identified as H/FR Valve Positioner. The device is normally used for automatically maintaining the position of a valve stem in a fluid conducting pipe.

As may be seen from the schematic diagram, the positioner 122 includes a pilot valve capsule 130 on the right side of the unit and an input capsule 132 on the left side. The pilot valve capsule includes a valve seat unit 134 attached to an upper diaphragm 136 and a lower diaphragm 138. The two diaphragms in combination with the central portion of the valve seat unit define an input pressure chamber 140 which is connected to an air input supply passage 142 leading to input line 125. The lower diaphragm 138 in combination with adjacent housing structure forms a control chamber 144 which is open to the supply passage 142 by way of a restriction 146, and is also open to a vent line 148 having an outlet nozzle 148a controlled by a baffle lever 150 which leads to an exhaust chamber 152 open by way of vent 154 to atmospheric pressure. The upper diaphragm 136 forms a wall of the exhaust chamber 152.

The air supply inlet line 142 is in direct communication with a chamber adjacent an upper pilot valve plunger 156, which controls fluid pressure through a line 158 leading to the chamber 60 on the lower side of the piston 56. The pilot valve plunger 156 includes an upper valve member 156a which cooperates with a surrounding housing seat to control flow into the conduit 158. The pilot valve plunger 156 also includes a lower valve member 156b, which cooperates with the upper end of the pilot valve seat unit 134 to control fluid flow from the piston chamber 60 through the conduit 158 and into a central passage 134a in the valve unit 134, which is open to the vent chamber 152. The positioner further includes a second pilot valve plunger 160 having a lower valve member 160a that cooperates with a spring-loaded valve seat 162 to control supply air input pressure leading to a conduit 164 which is connected to the chamber 62 in the upper end of the cylinder 58.

The pilot valve plunger 160 further includes a valve 160b on its upper end which cooperates with a valve seat on the lower end of the valve seat unit 134.

The input capsule 132 includes a pair of flexible diaphragms 166 and 168 and a central support unit 170 that define an input control pressure chamber 172. One end of the baffle lever 150 is secured to the upper element of the support unit 170, while the other end of the lever 150 is connected to the valve seat unit 134 of the pilot valve capsule 130. This lever controls the flow of air out of the detecting nozzle 148a on the upper end of the outlet passage 148.

The lower element of the support unit 170 attached to the diaphragms 166 and 168 is connected to one end of a tension range spring 174. The other end of the spring 174 is connected to a sensor arm 176 which is connected to the piston rod 52 to sense the vertical position of the rod. The connection between the sensor arm 176 and the lower end of the spring 174 includes means 178 for adjusting the tension on the spring 174.

OPERATION OF THE EMBODIMENT OF FIG. 5

In utilizing the system of FIG. 5, the first step is to energize the motor which drives the rotor of the sand mill or other mixing apparatus in which the speed is being controlled. The motor is energized by actuating a suitable control such as an "on" button illustrated in FIG. 1. Energizing the motor also energizes the solenoid valve 86 which permits a supply of pressurized air to be applied to the conduit 124 leading to the pressure regulator 120. Note that air pressure is applied directly to the positioner 122 by way of line 125.

The pressure regulator 120 may be manually set by rotating the adjustment wheel 120 to provide the desired fluid control pressure which will produce the desired motor speed. The Moore pressure regulator referred to above is provided with an indicating gauge that may be calibrated to correspond to rotor speed in revolutions per minute or rim speed in feet per second. Such a gauge is illustrated for example on the control box 24 for the apparatus in FIG. 1 adjacent the on/off buttons. The actual rotor speed may be sensed by a suitable instrument referred to above in connection with a discussion of FIGS. 1-4, and such indication may be shown on a suitable indicator such as the tachometer readout 114, shown in FIG. 1.

The piston 56 will normally be in the upper portion of the cylinder when the system is first started which is the slow speed position for the adjustable pulley combination illustrated in FIG. 3. Thus, if the desired speed setting is greater than the minimum speed provided by the pulley combination, it will be necessary to provide input pressure to the input capsule 132 of the positioner 122, which will cause air pressure to be applied to the chamber 62 in the upper end of the cylinder to force the piston and piston rod downwardly against the urging of the spring 80, shown in FIG. 3.

The control instrument pressure from the pressure regulator is applied though the conduit 126 into the chamber 172 formed by the diaphragms 166 and 168. An increase in pressure in that chamber moves the support unit 170 upwardly, which lifts the left end of the lever 150 upwardly, allowing increased air air flow out of the detecting nozzle 148a which is connected by the passage 148 to the chamber 144, which is connected to input air pressure by way of the restrictor 146. Increasing the air flow out of the nozzle 148a creates a pressure drop in the chamber 144. Since the chamber 140 is exposed directly to the supply air pressure, the reduction in pressure in chamber 144 causes the pilot valve seat unit 134a to move downwardly. This force moves the pilot valve plunger 160 downwardly, moving the valve member 160a away from its valve seat, thus permitting air pressure to be applied through conduit 164 to the upper chamber 62, applying a force against the upper surface of the piston 56, which moves the piston rod 52 downwardly. This action adjusts the effective diameters of the pulleys in the arrangement of FIG. 3 to increase the rotor speed, as is explained above.

Movement of the valve seat unit 134 downwardly moves the upper end of that unit away from the pilot valve member 156b, thereby opening the chamber 60 on the lower side of the piston to the passage 134a within the valve seat unit 134, which opens to the exhaust chamber 152 and the vent 154 which is open to atmospheric pressure. This further facilitates movement of the piston 56 in a downward, rotor speed increasing, direction.

Movement of the piston rod 52 is sensed by the sensing arm 176 which increases the tension on the range spring 174 and urges the support unit 170 of the input capsule 132 downwardly. This in turn reduces the air flow out of the detecting nozzle 148a, which results in an increased air pressure in the control chamber 144, causing the valve seat unit 134 to move upwardly. This action continues until the tension of the range spring 174 opposes exactly the force resulting from the control instrument pressure signal. At this point, the baffle lever 150 will have moved sufficiently toward the detecting nozzle to restore the pressure below the pilot valve capsule to its equilibrium value. As a force-balance condition is approached, the pilot valve capsule will be forced back to a neutral position wherein the pilot valve plungers 156 and 162 are neither supplying air to nor exhausting air from their respective sides of the piston 56.

It should be noted that since the baffle lever 150 is connected to both of the moving diaphragm units, there is provided a motion balancing, negative feedback in the detecting nozzle circuit. That is, movement of the left end of the lever 150 to increase flow out of the nozzle 148a results in the valve seat unit 134 moving downwardly, which tends to decrease the flow out of the detecting nozzle. This negative feedback insures high gain in the detecting circuit, tending to minimize the possibility of overshoot or instability.

A decrease in instrument air pressure reverses the above described actions and causes a proportional upward movement of the actuator piston to provide a decrease in rotor speed of the milling operation. That is, a decrease in control instrument pressure restricts the flow out of the detecting nozzle 148a which increases pressure within the control chamber 144. As the pressure in that chamber increases, it will cause the valve seat unit 134 to move upwardly, in view of the fact that the area exposed to the pressure in the control chamber 144 is greater than the area exposed to the pressure in the chamber 140. Movement of the valve seat unit 134 upwardly moves the pilot valve member 156a upwardly, away from its fixed seat, thus permitting input air pressure to be applied to the lower side of the piston 56. Simultaneously, the lower end of the valve seat 134 is moved away from the valve member 160b, so that the upper side of the actuated piston 56 is connected to the exhaust air line through the passage 134a within the valve seat unit 134 leading to the vent chamber 152 and vent 154. Thus, it may be seen that this automatic force balancing principle will result in the actuator piston being set and maintained in the position necessary to produce the desired rotor speed of the milling operation.

The upward motion of the piston 56, as just described, is particularly important from the standpoint of returning the control to the slow speed position when the air supply is interrupted. That is, if the solenoid valve 86 is de-energized when the power to the sand mill motor is interrupted, or the solenoid valve is otherwise responsive to the interruption of rotation of the rotor, the solenoid valve will move to interrupt air flow to the pressure regulator valve 120. This will result in a sudden decrease of regulator pressure applied to the control chamber 172. As explained above, this causes the baffle lever 150 to be moved downwardly, and will result in the upper side of the actuator piston being vented. Further, this causes the piston to be moved positively upwardly by the continued air pressure on the lower side of the piston. This moves the adjustable pulley combination to the slow-speed setting, so that when the rotor motor is once more energized, the rotor will start at this slower speed.

The arrangement of FIG. 5 is sensitive to the position of the piston rod 52. Thus, the accuracy of the system is dependent on the belt and pulley combination producing the same speed at that position. Wear in that combination, such as belt wear, might produce some variation. Similarly, an extra heavy load on the sandmill rotor might result in some speed variation. If so, the operator can observe the change in speed on the indicator 114 and adjust the pressure regulator 120 to compensate for this. Alternatively, this may be done automatically by converting the tachometer speed signal to a pneumatic signal and feeding it to a suitable pneumatic controller for modifying the output signal from the pressure regulator 120 to provide a signal to the positioner 122 that is proportional directly to speed rather than only indirectly by way of actuator position.

What is claimed is:

1. A method of controlling the speed of a dispersing or milling rotor in an industrial milling or dispersing operation comprising:
    providing a chamber for holding material to be milled or dispersed and a milling or dispersing rotor located therein;
    providing a motor;
    transmitting torque from the motor to the rotor by means of an adjustable pulley combination;
    controlling the speed of the rotor by controlling the position of the adjustable pulley combination by means of fluid pressure;
    applying said fluid pressure in a manner to obtain a desired rotor speed; and
    automatically moving said adjustable pulley combination to its slow speed position when said motor is shut off.

2. The method of claim 1 including the step of providing a pressure signal which is proportional to a selected rotor speed to a positioner for controlling the fluid pressure applied to adjust said pulley combination, with the movement applied to the pulley combination being fed back to the positioner to provide a signal for automatically maintaining the desired position whereby the optimum rotor speed may be selected consistent with the material being processed during said operation.

3. The method of claim 1 including venting the supply of pressurized fluid from one side of the control actuating element to increase rotor speed, and venting fluid pressure from the other side of the control actuator to increase rotor speed.

4. The method of claim 1 including applying fluid pressures to both sides of an actuating piston to maintain the piston in a desired position, and selectively venting fluid pressure from either side of the piston to move the piston in the desire direction to increase or decrease rotor speed.

5. The method of claim 1 including automatically venting the side of the actuator to produce the slow speed setting when the power to the system is shut down.

6. Industrial milling or dispersing apparatus comprising:
    a container for holding material to be milled or dispersed;
    an impeller located within said container, said impeller adapted to mill or disperse the material;
    a drive motor;
    a variable drive ratio transmission connected to said motor and said impeller to transfer the driving force of said motor to said impeller;

a manually operable control device connected to said transmission to vary the speed of said impeller by varying the drive ratio; and an automatic override system connected to said transmission automatically changing said drive ratio of said transmission to a ratio corresponding to a low impeller start-up speed when the drive motor is shut off.

7. The apparatus of claim 6 wherein said transmission comprises two adjustable pulleys connected by a torque transmitting element, wherein one pulley is connected to said motor and the other pulley is connected to said impeller, and wherein the speed of said impeller can be adjusted by adjusting the effective diameter of the controllable pulleys.

8. The apparatus of claim 7 wherein one of said pulleys is controlled by a fluid pressure system which acts to vary the effective diameter of the pulley.

9. The apparatus of claim 8 wherein said control device includes a fluid pressure system comprising:
a cylinder and a piston located in said cylinder, said piston connected to one side of one of said pulleys such that when said piston is moved in a first direction the effective diameter of said pulley is increased and when said piston is moved in a second direction the effective diameter of said pulley is decreased;
a fluid pressure system connected to said cylinder having a fluid pressure source and first and second conduits communicating with said cylinder, said first conduit connected to said cylinder on a first side of said piston and said second conduit connected to said cylinder on the second side of said piston;
a first valve in said first conduit controlling the flow of fluid to the portion of the cylinder on the first side of said piston, a second valve in said second conduit controlling the flow of fluid to the portion of the cylinder on the second side of said piston, said first valve being actuatable to control movement of said piston in said first direction and said second valve being actuatable to control movement of said piston in said second direction.

10. Apparatus as claimed in claim 9 wherein said automatic override system includes means for sensing that the motor has been shut off and for automatically venting the pressure in the portion of the cylinder on the second side of said piston and thereby shifting the adjustable pulley combination to a low speed start-up position.

11. Apparatus as claimed in claim 10 wherein said automatic vent means includes a vent valve and said sensing means comprises a solenoid coupled to the drive motor and to said vent valve, said solenoid sensing the shut down of the motor and activating the vent valve to vent the pressure in the portion of the cylinder in the second side of said piston in order to shift the two pulley combination to a slow start-up speed position.

12. Apparatus as claimed in claim 11 further comprising restrictor means in said conduits for regulating the rate at which the pressure operated piston is vented.

13. The apparatus of claim 6 wherein said control device includes a speed selector to select a desired impeller speed, and means responsive to said speed selector for automatically varying said variable speed transmission to provide an impeller speed corresponding to the selected speed.

14. Industrial milling or dispersing apparatus comprising:
a container holding material to be milled or dispersed, said material being of a type which increases its resistance to movement after a period of time during which no movement occurs;
an impeller located within said container to process said material;
a drive motor;
a variable drive ratio transmission connected to said motor and said impeller to transfer the driving force of said motor to said impeller; and
a device connected to said transmission automatically adjusting said transmission to a drive ratio corresponding to a low impeller start-up speed when the motor is shut off.

15. The apparatus of claim 14 wherein said transmission includes:
an adjustable pulley combination mechanically moveable by a fluid powered actuator; and
wherein said automatic speed reducing device includes a fluid control circuit that causes the fluid powered actuator to move the adjustable pulley combination automatically to a low start-up speed when the motor is shut off.

16. The apparatus of claim 14 wherein:
said adjustable pulley combination includes spring means for mechanically urging the pulley combination into a slow speed position;
said actuator is connected to oppose the spring force to move the pulley combination to a faster speed position; and
said automatic speed reducing device further including means for applying fluid power to said actuator when said motor is applying power to the impeller, including means for interrupting fluid power to the actuator when the motor is not applying power to the impeller.

17. The apparatus of claim 16 wherein:
said actuator includes a piston in a cylinder with a chamber formed on opposite ends of the piston whereby unbalanced fluid pressure applied to the piston will produce movement of the actuator to increase or decrease the impeller speed;
said automatic speed reducing device includes valve means for venting fluid pressure from one side of said piston to permit said spring force to move the pulley combination to the low-speed position.

18. The apparatus of claim 17 wherein:
said transmission includes a pair of pulleys connected by a belt, with each of said pulleys including two pulley halves at least one of which is axially moveable, the opposing faces of the pulley halves being formed so that the belt will move more radially in or out as the spaces between the pulley halves are changed thereby changing the effective or working diameter of the pulleys; and
said spring means and said actuator are connected to control the position of the pulley halves and thereby the speed of said impeller shaft.

19. A method of milling or dispersing material comprising:
providing a chamber with a power driven impeller located herein;
adding to the chamber material to be processed by the power driven impeller;
processing the added material by driving the impeller for a first period of time;

stopping the impeller and permitting the material to sit idly for a second period of time, the material being such that during the second period its resistance to movement by the impeller increases;

providing a variable drive ratio transmission between the impeller power source and the impeller permitting variation of the impeller speed by changing the drive ratio; and automatically returning the transmission to a drive ratio corresponding to a low impeller speed setting when the impeller power source is shut off.

20. Industrial milling or dispersing apparatus comprising:

a container for holding material to be milled or dispersed;

a rotor located within said container, said rotor adapted to mill or disperse the material;

a drive motor;

a variable drive ratio transmission connected to said motor and said rotor to transfer the driving force of said motor to said rotor, said variable drive ratio transmission including a moveable actuator to vary the drive ratio which in turn varies the speed of the rotor;

means for manually selecting the rotor speed, said selector means having a plurality of positions and calibrated to provide an indication of rotor speed corresponding to at least a portion of said plurality of selector positions;

a source of pressurized fluid;

said speed selector means comprising variable pressure regulator means for providing an output pressure which is proportional to the selected rotor speed, said regulator means having an input port and an output port, said input port of said regulator being connected to said source of pressurized fluid;

a transmission control device including a fluid pressure controlled positioner responsive to the pressure at said output port of said regulator means to vary the position of said actuator to change the speed of said transmission to a higher speed when the output pressure of said regulator means changes to output a pressure corresponding to a higher speed and to a lower speed when the output pressure of said regulator means changes to output a pressure corresponding to a lower speed;

said fluid pressure controlled positioner including means for automatically maintaining the actuator in a position to obtain the selected rotor speed whereby an optimum speed may be obtained consistent with the material being processed by the apparatus, said automatic position maintaining means includes means for sensing the position of the actuator and for using this information to make adjustments to the position of the actuator as needed to maintain the rotor speed at a speed corresponding to the output pressure of said regulator means.

21. The apparatus of claim 20 further comprising an automatic override system automatically reducing the drive ratio of said transmission to a position corresponding to a low start up speed when the motor is shut off.

22. The apparatus of claim 20 further comprising an automatic cut-off valve located between said source of pressurized fluid and said regulator, said valve responsive to a termination of the driving force applied to said rotor to cut-off said source from said regulator whereby said positioner will move said transmission into a low speed start-up position upon shutdown of the apparatus.

23. The apparatus of claim 22 wherein said motor is an electric motor and said cut-off valve is controlled by a solenoid, said valve being open when the solenoid is energized and closed when the solenoid is not energized, a power switch providing power to the solenoid only when power is provided to the motor.

24. The apparatus of claim 20 wherein said positioner includes means for sensing the position of said actuator to provide feedback information to the positioner.

25. The apparatus of claim 20 wherein said positioner uses fluid pressure to provide the force needed to move said actuator, said positioner including a piston connected to said actuator, said piston moveable within an enclosed cylinder having first and second ends defining first and second chambers, said first chamber being on the side of said piston facing said first end of said cylinder and said second chamber being on the side of said piston facing said second end, a first inlet pressure port communicating with said first chamber and a second inlet pressure port communicating with said second chamber, whereby a higher pressure in said first chamber than in said second chamber acts to move said piston toward said second end increasing the speed of said rotor while a higher pressure in said second chamber than said first chamber moves said piston toward said first end reducing the speed of said rotor; said positioner further including first and second interconnected valve members, said first valve member connected between said source of pressurized fluid and said first chamber, said second valve member connected between said source of pressurized fluid and said second chamber, said first and second interconnected valve members being responsive to the control pressure applied by said speed selector to vent the second chamber and provide pressure to the first chamber when the control pressure increases and to vent the first chamber while providing pressure to the second chamber when the control pressure decreases.

26. The apparatus of claim 25 further comprising an automatic cut-off valve located between said source of pressurized fluid and said regulator said valve responsive to a termination of the driving force applied to said rotor to cut-off said source from said regulator whereby said positioner will move said transmission into a low speed start-up position upon shutdown of the apparatus.

27. The apparatus of claim 20 wherein said transmission is an adjustable belt and pulley combination and said fluid pressure controlled positioner has an inlet connected to said source of pressurized fluid, a fluid outlet connected to a chamber on one side of the actuator and a fluid outlet connected to a chamber on the other side of the actuator, a fluid exhaust outlet, valve means for selectively controlling the fluid pressure applied to and exhausted from said chambers to control the actuator position, said speed selector transmitting a fluid pressure signal to said valve means to control the operation of the valve means, and means for modifying said signal responsive to the position of said actuator.

* * * * *